June 16, 1942.  F. H. REICHEL ET AL  2,286,645
PROCESS AND APPARATUS FOR PRODUCING ARTICLES AND THE PRODUCTS PRODUCED
Filed Nov. 7, 1938
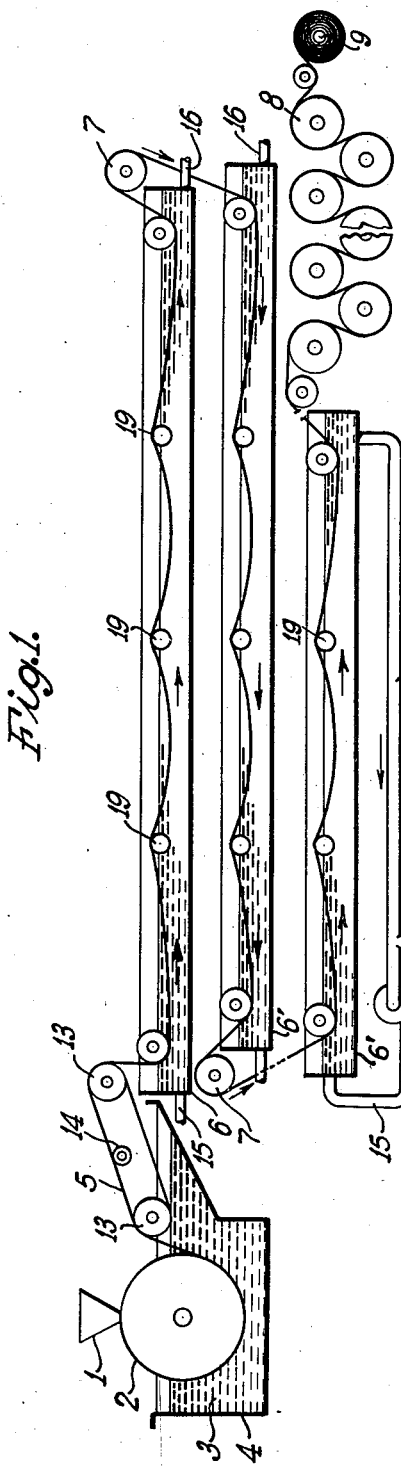
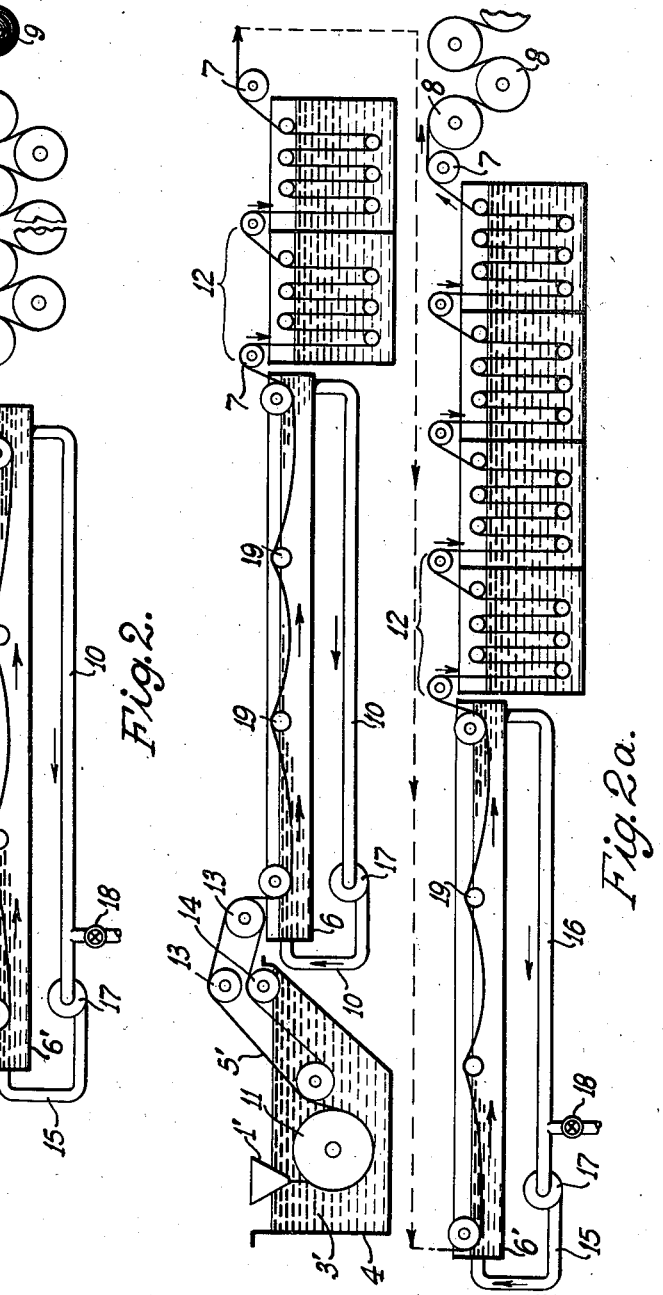
INVENTOR.
FRANK H. REICHEL
ARTHUR O. RUSSELL
BY Worth Wade
ATTORNEYS.

Patented June 16, 1942

2,286,645

UNITED STATES PATENT OFFICE 2,286,645

PROCESS AND APPARATUS FOR PRODUCING ARTICLES AND THE PRODUCTS PRODUCED

Frank H. Reichel and Arthur O. Russell, Fredericksburg, Va., assignors to Sylvania Industrial Corporation, Fredericksburg, Va., a corporation of Virginia Application November 7, 1938, Serial No. 239,290

12 Claims. (Cl. 18—15)

This invention relates to pellicles of regenerated cellulose, and more particularly to a process and apparatus for the production of regenerated cellulose in the form of continuous films and the pellicles so produced, and includes correlated improvements designed to enhance the properties of such pellicles so as to extend their uses.

Continuous films of regenerated cellulose have been produced heretofore in accordance with two conventional known processes. One of these processes, usually referred to as the extrusion hopper process, comprises the extrusion of a cellulosic solution, such as viscose, through the slit-like orifice of a hopper, into a coagulating and/or regenerating bath. The other common method, usually referred to as the wheel casting process, comprises casting viscose or the like by causing it to flow on the surface of a rotating wheel, the wheel carrying the layer of viscose into a coagulating and/or regenerating bath. In both of these conventional methods the films so produced are passed from the coagulating and/or regenerating bath in a sinuous path through various treating baths, such as baths for washing, desulphurizing, bleaching and softening. After emerging from the final treating bath, the film is led over a series of heated rollers to dry it, and is finally wound upon a roll. In both of such prior processes, the film must pass over and around more than a hundred rollers in its travel from the wet to the dry end of the machine.

It has been found that the majority of the shrinkage of films produced by conventional processes occurs during the steps of regenerating the cellulose, desulphurizing and drying. For example, a film made from viscose on a conventional machine of the type disclosed in U. S. Patent No. 1,117,604 may shrink transversely about 25% during coagulation and regeneration in an acid bath, 5% during desulphurizing, and 10% during drying. In such an apparatus the films are restrained from shrinking in their longitudinal direction because of the large number of driven rollers which continuously pull the film through the machine, while the slippage of the film in the machine direction is substantially negligible. On the other hand, in such prior machines, the films are substantially unsupported in a direction transverse of the machine during coagulation and regeneration so that the films are substantially free to shrink in width.

As a result of this shrinkage in the transverse direction and prevention of shrinkage in the longitudinal direction, such prior films are therefore almost twice as strong in their longitudinal direction as in their transverse direction, but the longitudinal stretch is only 50% of the transverse stretch. This is probably due to the micelles being aligned longitudinally, thus imparting a "grain" in the direction in which the film travels through the machine. When the finished film is used for wrapping or other well known uses, it is subjected to approximately equal strains in all directions in the plane of the film under which condition it will have a tendency to rupture along a line taken in the longitudinal direction of the film.

In order to overcome these disadvantages it has been proposed to stretch a pellicle transversely of its direction of travel during the step of coagulating and/or regenerating the same. To attempt to stretch uniformly a viscose film when it is cast into a regenerating bath is difficult and unsatisfactory because the film is moving and non-uniform in plasticity. As soon as the film meets the acid bath, regeneration of the cellulose commences and progressively increases, so that the film constantly changes and offers constantly increasing resistance to stretching force. The result is that the stretching force tends both to rupture the film and to stretch it non-uniformly.

The problems presented in the chemical regenreation of hydrophilic cellulose hydrate films from viscose and the like are entirely different from those presented by the production of hydrophobic cellulose derivatives from stable cellulose derivatives such as cellulose acetate and from resins because solutions of such film-forming materials can be converted to a finished pellicle by the purely physical operation of drying which does not result in substantial shrinkage.

Accordingly, it is the general object of the present invention to provide for the production of pellicles of regenerated cellulose having increased tensile strength transversely and increased elasticity longitudinally.

It is a specific object of the invention to provide a pellicle of regenerated cellulose which exhibits less difference in tensile strength both longitudinally and transversely, or preferably substantially the same properties in transverse and longitudinal directions than pellicles of cellulose hydrate made by prior processes.

It is another object of the invention to provide a process for making, from dispersions of cellulosic material in a continuous manner, films of regenerated cellulose which are capable of stretching to a substantial extent both transversely and longitudinally.

It is a specific object of the invention to provide a process for making pellicles of regenerated cellulose in the form of a continuous web which is characterized by having a substantially uniform thickness from edge to edge and being substantially free of longitudinal beads at the edges.

It is a further object of the invention to provide an apparatus for forming pellicles of non-fibrous cellulosic material in a continuous manner such that the pellicles are not subjected to substantial longitudinal tension during their travels through the apparatus.

Other objects of the invention will in part be obvious and will in part appear hereinafter.

In the practice of the invention, a pellicle of regenerated cellulose in the form of a continuous film having substantially uniform properties transversely and longitudinally is produced by continuously forming a film from a dispersion of coagulable cellulosic material from which cellulose may be regenerated, coagulating the film, and regenerating the cellulose thereof without subjecting the film to substantial tension preferably while permitting the film to shrink and thereafter purifying, softening, drying and otherwise finishing the pellicle in a known manner.

Since it has been found that the majority of the shrinkage of freshly formed films of viscose takes place during the steps of regenerating and desulphurizing, the now preferred embodiment of the process involves continuously extruding a continuous film from viscose, coagulating the film and carrying out the steps of regenerating and desulphurizing the film while it is maintained substantially free of longitudinal tension, and preferably allowing the film to shrink longitudinally to substantially the same extent that it shrinks transversely. Between regenerating and desulphurizing and after desulphurizing, it is optional whether or not some longitudinal tension is placed on the pellicle, for example, during the steps of washing, bleaching, softening and the like.

The invention accordingly comprises the process having the several steps and the relation of one or more of such steps with respect to each of the others, the apparatus embodying features of construction, combinations and arrangement of parts adapted to effect such steps, and the article which possesses the characteristics, properties and relation of elements, all as exemplified in the detailed disclosure hereinafter set forth and the scope of the invention will be indicated in the claims.

For a more complete understanding of the nature and objects of the invention, reference should be had to the following detailed description taken in connection with the accompanying drawing, in which:

Fig. 1 is a diagrammatical representation of one embodiment of the apparatus of the invention; and Figs. 2 and 2a form a diagrammatical representation of a second embodiment of the apparatus of the invention.

The pellicle of the invention may be produced from any suitable coagulable film-forming dispersion of cellulose from which cellulose may be regenerated, such, for example, as from viscose solutions, cuprammonium solutions or solutions of cellulose in inorganic salts such as zinc chloride, alkali metal thiocyanates, alkali perchlorates, or in inorganic acids such as sulphuric acid, phosphoric acid, or solutions of cellulose in organic solvents such, for example, as amines and quaternary ammonium compounds. All of these solutions have a common characteristic in that they can be coagulated by known chemical coagulants and the cellulose in the coagulum may be regenerated therefrom by the use of suitable chemical regenerating agents well known to those skilled in the art; and the expression "dispersion of a coagulable cellulosic material from which cellulose may be regenerated" is intended to include all the classes of dispersions or solutions above-mentioned.

In the present invention, any suitable method may be used for forming the cellulosic material in the form of a continuous film. One may form the film by extrusion as from a hopper or by casting as upon the surface of a wheel or otherwise in a continuous manner. In the now preferred embodiment the cellulose solution is extruded through a slit-like orifice of a hopper, the slit being immersed a few inches below the surface of a liquid coagulant.

The coagulant to be employed will depend, inter alia, upon the nature of the film-forming cellulose solution, the rate of production, the method of forming the pellicle and other known factors. Preferably, there is employed a coagulant which will coagulate the cellulosic material rapidly to firm self-sustaining gel pellicle, but which preferably does not simultaneously completely regenerate the cellulose. For example, with viscose the coagulant may be an ammonium sulphate solution. It is advantageous to permit the freshly formed pellicle to shrink freely during coagulation. Any rollers used for conveying the freshly coagulated pellicle should be of large diameter and the pellicle should contact only the wet, preferably submerged surfaces thereof.

The particular regenerating bath to be employed in the present process will depend, inter alia, upon the nature of the film-forming cellulosic material and the conditions of production and a suitable regenerating agent may be readily selected by one skilled in the art. The regeneration of the cellulose is effected by treating the gel pellicle of coagulated compound while the pellicle is free to shrink both transversely and longitudinally and preferably equally in both directions. In the now preferred practice, the cellulose is regenerated as the pellicle is carried by a moving body or stream of regenerating liquor, the period of contact being sufficient to effect a substantially complete regeneration.

The regenerated cellulose pellicle may be acidified after passing from the regenerating bath to ensure complete regeneration. Thereafter, the pellicle may be washed and neutralized, preferably without exerting a substantial longitudinal tension on the film during such treatments. When the cellulose is regenerated from viscose, it may be desulphurized by means of any suitable agent as well known in the art, such, for example, as a hot bath comprising a mixture of sodium hydroxide and sodium sulphide. During desulphurization, the film is permitted to shrink transversely and longitudinally. In the now preferred practice, the pellicle is desulphurized while it is carried by a moving body or stream of desulphurizing liquor.

The desulphurized film may be washed, acidified, washed, bleached, again washed, and plasticized in a known manner using suitable agents known to those skilled in the art. Since a regenerated cellulose film shrinks to only a small extent during these steps, it is not essential that the film be conveyed so as to enable it to shrink freely. However, the film is preferably not placed, even in these operations, under substantial longitudinal tension. For example, one may employ conventional treating baths comprising deep vats through which the film passes in a sinuous path over a plurality of rollers, but the rollers are preferably driven at such a speed that the film is conveyed forward, but not substantially stretched longitudinally.

The purified and plasticized pellicle is dried preferably while subjecting it only to sufficient longitudinal tension to prevent it from wrinkling, so that the dried product will be smooth. In the now preferred embodiment of the process, the film is dried by carrying it over a plurality of rollers which are driven at such a speed that the film is conveyed, but not substantially stretched longitudinally, the rollers being heated or enclosed in a heated atmosphere.

Generally speaking, the apparatus of the invention comprises means for continuously forming a film from a dispersion of a coagulable cellulosic material from which cellulose may be regenerated, and means for conveying the film while the cellulose thereof is being regenerated without subjecting the film to substantial tension. In particular, the apparatus consists of the combination of means for continuously extruding a film from a coagulable cellulosic material, a plurality of vessels adapted to contain respectively liquids for coagulating, regenerating, desulphurizing, purifying, washing, softening and other known finishing liquids, at least the vessel containing the regenerating liquid consisting of an elongated relatively flat tank and means for imparting motion to the body of the liquid therein sufficient to convey the film lengthwise through the vessel so that the film is substantially free to shrink transversely and longitudinally during regeneration. The expression "means for conveying the pellicle without exerting longitudinal tension thereon" as used in the description in the appended claims, is intended to designate any means which does not exert tension as by pulling on the forward end of the film and includes a body of or stream of liquid moving longitudinally of the pellicle and adapted to exert sufficient force on the pellicle to convey the pellicle in the same direction and the combination of such a moving body or stream of liquid with positively driven rollers, the surface speed of which is such as to convey but not to stretch the film.

By way of illustrating, but not by way of limiting the invention, two embodiments of the apparatus of the invention are illustrated in the drawing.

In that embodiment of the apparatus shown in Fig. 1, the film-forming means comprises a hopper 1 having a slit in the bottom (not shown) and positioned to deposit a cellulose solution on the surface of a roller 2 adapted to be rotated through a bath 3 of coagulant contained in a vessel 4, the pellicle passing onto a conveying means comprising an endless belt 5 which delivers the film to a regenerating bath contained in an elongated vessel 6, the film being conveyed by a current of liquid moving in the direction of the arrows. From the regenerating bath, the film is conveyed by a positively driven roller 7 through a succession of elongated vessels 6', all of which contain a liquid moving in the direction in which the film is to be conveyed. At the forward end of the last treating vessel 6' there is positioned a suitable apparatus for drying the film such, for example, as a plurality of rollers 8 which may be heated by any conventional means not shown. The dried film may be wound upon a reel 9.

In that embodiment of the apparatus shown in Figs. 2 and 2a, the film-forming means comprises a hopper 1' having a slit in the bottom (not shown) and positioned so that the slit is just beneath the surface of a bath of coagulant contained in a vessel 4. Positioned below and forward of the slit is a roller 11 preferably submerged and positioned to receive the film and pass it to a conveying means comprising an endless belt 5' from which the film is delivered into a regenerating bath contained in a shallow elongated vessel 6. Forward of the regenerating vessel 6, there are positioned in series a plurality of conventional treating baths of the deep-vat type identified generally as 11 wherein the pellicle may be washed or otherwise treated with liquids. From such treating baths, the pellicle may be conveyed by suitable means, such as rotating roller 7, to a desulphurizing bath contained in a shallow elongated vessel 6'. Forward of this vessel, there are positioned a plurality of conventional treating baths of the deep-vat type designated generally 12, which serve for desulphurizing, washing, bleaching, dyeing, softening or otherwise finishing the pellicle. From the last of such baths, the pellicle may be conveyed to suitable drying apparatus such as a plurality of cylinder rollers 8 which may be internally heated by means of hot water.

The endless belts 5 and 5', which serve to convey the freshly coagulated film from the vessel 4 to the vessel 6 in each of the embodiments of the apparatus above shown, extend over the entire width of the pellicle and should be constructed of a suitable, flexible, non-porous and non-corrosive material. In the now preferred embodiment of the apparatus, this conveying belt is made of Monel metal in the form of a linked screen having spaces between the links through which liquid may drain and the surface of which is sufficiently uneven to exert a substantial drag on the film conveyed. The belt is positioned to travel about spaced rollers 13 which are preferably rubber-covered. If necessary, auxiliary adjustable rubber-covered rollers 14 may be employed for taking up any slack in the belt and for maintaining the upper section taut. It is preferable to position the receiving end of the belt below the surface of the coagulating liquid, as shown in Fig. 2, so that the freshly formed film does not travel unsupported through an air space in passing from the belt to the surface of the belt, because the liquid tends to support the weak film. The conveying belt is so positioned with respect to the surface of the roller 2 of Fig. 1 (11 in Fig. 2) that the film does not travel through an acute angle in passing from the bath to the conveying belt 5. The conveying belts 5 and 5' play an important role in the process inasmuch as they afford a means for carrying the weak freshly coagulated gel pellicle from the coagulating bath to the regenerating bath without exerting substantial longitudinal tension on the film, thus avoiding breaking the film. The use of such a belt facilitates the production of pellicles at a greater speed than is possible in its absence.

For forming a stream or imparting a flow to the various liquids in the several shallow vessels 6, there may be employed any suitable device, such as a pump, a paddle wheel, or a gravity flow device, as known in the art. In the now preferred embodiment, the tanks 6 are each provided with an inlet pipe 15, an outlet pipe 16 connected in a closed circuit through a pump 17 although only one tank is shown thus equipped in Fig. 1. Fresh liquid may be introduced into the system at a point preferably just forward of the pump, for example, through the pipe 18. In the practice of the process, the pump is employed to force the liquid into the shallow vessel 6 at the receiving end so that the stream of liquid flows toward the dry end of the machine. Since the vessels 6 need not be any wider than the maximum width of the film, and may be quite shallow, a substantial current velocity can be readily maintained in the treating liquid. The liquid is preferably introduced underneath the film with high velocity to create a buoyant force sufficient to convey the film through the vessel, the force being applied uniformly over the surface of the film.

With certain film-forming substances such as viscose, gases are generated in the film in certain of the baths, particularly in the regenerating and desulphurizing baths. To prevent such gases from forming air pockets beneath the film, there are positioned transverse the vessels 6 a plurality of rods 19, preferably of glass, placed at suitable intervals. If the rods are sufficiently smooth of surface, they need not be positively driven. The rods 19 are positioned with their tops just above the surface of the liquid so that the gas entrapped below the film may escape at the sides as the film passes over the rods. Since most gel cellulose pellicles tend to sink in the treating liquids, the rods serve the additional function of maintaining the film adjacent the upper surface of the bath where the current velocity is the highest.

For conveying the films from one vessel to the next adjacent vessel, there is preferably employed a roller such as 7, which has a large diameter. These rollers are positively driven, the speed being synchronized with the velocity of the stream of liquid in the vessels 6 so that the film is not subjected to substantial longitudinal tension by such rollers.

It is understood that various changes may be made in the apparatus without transcending the scope of the invention. If desired, the rollers 7 may be replaced by endless conveying belts, such as the belts 5 and 5' shown in the drawing, when the vessels 6 are placed end to end in series. Further, instead of using the long shallow treating vessels 6, there may be employed a deeper vessel with conventional means for carrying the film in a festooned condition through the vessel whereby the film is permitted to shrink both transversely and longitudinally during treatment. The shallow elongated tanks described above are preferred, however, because they permit of a more rapid and uniform operation with constant inspection of the material being treated and a plurality of such vessels may be positioned one above the other to save space.

It is to be understood that various changes can be made in the process and apparatus to adapt it for producing a pellicle of a particular thickness. For example, with thicker pellicles, it is advisable to employ longer tanks of the flat type herein disclosed than with thinner pellicles. Also, other extrusion and drying means may be substituted for those herein disclosed without transcending the scope of the present invention. It is to be understood that various changes can be made in the article. For example, the web pellicle may be colored, dyed, filled with pigment and effect materials, and fireproofed, waterproofed and otherwise finished in a known manner.

By way of illustrating but not by way of limiting the invention, there will be given in the following table the characteristic of a continuous web pellicle of cellulose hydrate prepared according to the process and with the apparatus of the present invention as compared with a web pellicle made on a machine of the known and conventional type using the same viscose solutions and producing a film of substantially the same thickness. Column A gives the characteristics of a pellicle made by the present process using an apparatus of the type shown in Fig. 1 and avoiding longitudinally stretching during all steps. Column B gives the properties of a pellicle made with the same chemical treatment as in A but by the prior practice using a conventional apparatus such as the type shown in U. S. Patent No. 1,117,604 with longitudinal tension during all steps.

1. *Comparison of the web pellicles after plasticizing and before drying*

| A | | | | B | | | |
|---|---|---|---|---|---|---|---|
| Lengthwise | | Transverse | | Lengthwise | | Transverse | |
| Tensile strength | Stretch | Tensile strength | Stretch | Tensile strength | Stretch | Tensile strength | Stretch |
| 2,666 | Percent 38 | 2,556 | Percent 40 | 3,510 | Percent 23 | 2,100 | Percent 47 |

2. *Comparison of same web pellicles after drying*

| A | | | | B | | | |
|---|---|---|---|---|---|---|---|
| Lengthwise | | Transverse | | Lengthwise | | Transverse | |
| Tensile strength | Stretch | Tensile strength | Stretch | Tensile strength | Stretch | Tensile strength | Stretch |
| 2,680 | Percent 38 | 2,573 | Percent 38 | 3,360 | Percent 23 | 2,076 | Percent 49 |

From the above tables, it is apparent that by the present process there is produced a new pellicle of regenerated cellulose in the form of a continuous web having substantially uniform tensile strength and stretch longitudinally and transversely of the web. The web pellicle made by the prior practice has a tensile strength transverse which is not more than 60% of the tensile strength lengthwise of the pellicle, while the transverse stretch is 100% greater than the stretch lengthwise. Accordingly, the product produced by the present process is adapted for a wider use with a longer life in those commercial applications for which the prior sheets have been heretofore used. However, due to the substantial uniformity in the properties of the web pellicle herein provided, the article is adapted for a wide variety of uses for which the web pellicles heretofore made have not been adapted or were less well adapted. The pellicle of the invention wrinkles less than the prior pellicle under changing atmospheric conditions. For example, the pellicle of the present invention may have designs applied thereon by printing, lithography, photography and the printed deposits will not become distorted due to the uneven swelling and shrinkage of the pellicle under varying atmospheric conditions as is the case with prior pellicles having highly non-uniform properties. Further, if the pellicle of the invention is coated on one or both sides with a coating composition, more particularly a transparent moistureproof composition, the coating will exhibit a materially improved adherence to the pellicle because the pellicle does not swell and shrink unevenly. Further, the web pellicle may be laminated to itself or to other sheet materials and the products produced will show new and substantially uniform properties. In particular, the laminae will not tend to separate as much as with regenerated cellulose pellicles heretofore produced. It is understood that these examples are but a few of the many new uses to which the article of the invention is adapted by reason of its novel uniform properties.

While the above table of comparison and remarks has been made with respect to the pellicle produced by the present process using the apparatus of Fig. 1, it is to be understood that with the apparatus of the type shown in Figs. 2 and 2a there is produced an article in which the transverse tensile strength is at least 80% of the longitudinal tensile strength and the transverse stretch not more than 20% greater than the longitudinal strength. As such sheets are well adapted for many uses, the invention is not limited to the production of articles having substantially uniform properties in all directions, since in the production of such other web pellicles, most of the advantages of the present process and apparatus are obtainable.

One embodiment of the article of the invention comprises a continuous web pellicle of regenerated cellulose combined with a moistureproofing composition. The web pellicle may be moistureproofed by impregnation or by coating it in a known manner either in the gel state as it comes from the plasticizing treatment, or after partial or complete drying of the pellicle. In general, the moistureproof coating may, for example, comprise one of the following types of compositions: (1) a film-forming substance, e. g. cellulose derivative, rubber, resin, etc., and a moistureproofing agent, e. g. a natural or artificial wax, (2) a film-forming substance, a plasticizer and a wax, and (3) a film-forming substance, a plasticizer, a wax-blending agent and a wax. Such compositions are dissolved in a suitable solvent and applied to one for both sides of the pellicle and the solvent evaporated at an elevated temperature, preferably above the melting point of the wax, the ingredients being used in such proportions as to deposit upon the evaporation of the solvent a transparent, non-tacky moistureproof coating.

The moistureproofed pellicle is characterized by showing a strong adherence of the coating to the base pellicle even when the coated material is immersed in water, because the swelling and shrinking of the pellicle is substantially uniform in all directions. If a plasticizer is employed in the composition in sufficient quantity to enable the coating to follow the changes in dimensions of the base pellicle, the adherence will be greatly improved.

Since certain changes may be made in carrying out the above process and in the product, and modifications effected in the apparatus for practicing the principle thereof, without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. In a process of preparing a pellicle of regenerated cellulose in the form of a continuous film, the steps comprising continuously forming a film from a dispersion of a coagulable cellulosic material from which cellulose may be regenerated, continuously carrying the film by means of a moving body of regenerating liquid without subjecting the film to substantial longitudinal tension and regenerating the cellulose thereof while the film is being thus conveyed.

2. A process of preparing a pellicle of regenerated cellulose in the form of a continuous film, comprising continuously extruding viscose into a coagulant in the form of a film, coagulating the viscose, carrying the film by means of a moving body of a liquid capable of regenerating cellulose without subjecting the film to substantial longitudinal tension and regenerating the cellulose thereof while the film is thus conveyed.

3. A process of preparing a pellicle of regenerated cellulose in the form of a continuous film, comprising extruding a dispersion of a coagulable cellulosic material, from which cellulose may be regenerated, into a coagulating bath wherein the film is coagulated, conveying the coagulated film upon a moving endless belt to a flowing body of a liquid capable of regenerating cellulose and conveying the cellulose film by said body of liquid without subjecting the film to substantial longitudinal tension while regenerating the film.

4. In an apparatus for preparing a pellicle of regenerated cellulose in the form of a continuous film, the combination of, means for continuously extruding a film from a dispersion of a coagulable cellulosic material from which cellulose may be regenerated, a vessel containing a liquid coagulant positioned to receive said extruded film, an elongated vessel containing a body of regenerating liquid, an endless belt disposed to convey a film from the coagulating liquid and deposit it in the regenerating liquid and means for imparting motion to said body of regenerating liquid to flow the liquid in the direction of movement of the film at the proper speed to convey the film lengthwise through said vessel after it leaves the belt without subjecting the film to substantial longitudinal tension.

5. In an apparatus for preparing a pellicle of regenerated cellulose in the form of a continuous film, the combination of, means for continuously forming a film from a dispersion of a coagulable cellulosic material from which cellulose may be regenerated, a plurality of vessels in series adapted to contain respectively liquids for regenerating, purifying and washing the film, said vessels consisting of elongated relatively shallow tanks, means for imparting motion to the liquid in each of said tanks of the proper speed to carry the film lengthwise through said tanks without subjecting the film to substantial longitudinal tension, means for passing the film into one of said tanks, and means located between successive tanks to pass the film from one tank to another while inverting the film.

6. As an article of manufacture, a pellicle of regenerated cellulose in the form of a continuous film, having substantially uniform properties in all directions resulting from continuously forming a film from a dispersion of a coagulable cellulosic material from which cellulose may be regenerated, continuously carrying the film by means of a moving body of liquid without subjecting the film to substantial longitudinal tension and regenerating the cellulose thereof while the film is being thus conveyed.

7. In the production of sheets and films from cellulosic film-forming compositions which may be regenerated in a liquid bath to form regenerated cellulose, the steps of extruding the film-forming composition, in the form of a sheet into a coagulating bath, passing the sheet from the coagulating bath into a passing body of regenerating liquid, forwarding said regenerated cellulose sheet by means of said moving liquid to another passing body of regenerating liquid, passing the sheet in inverted position through said other body of liquid and forwarding said sheet during said passage by means of said moving liquid.

8. In the production of sheets and films from film-forming compositions coagulable in a liquid coagulating bath, the steps of extruding a film-forming composition in the form of a sheet, coagulating the film-forming composition of the sheet, passing the sheet into a moving body of regenerating liquid, forwarding said sheet by means of said moving liquid to a passing body of treating liquid, passing the sheet in inverted position through said body of treating liquid and forwarding said sheet during said passage by means of the moving body of treating liquid.

9. In the production of sheets and films from film-forming compositions coagulable in a liquid coagulating bath, the steps of extruding a film-forming composition in the form of a sheet into a bath of coagulating liquid, passing the sheet from the bath of coagulating liquid into a passing body of regenerating liquid, forwarding said sheet by means of said moving liquid to another passing body of treating liquid, passing the sheet in inverted position through said second passing body of treating liquid and forwarding said sheet during said passage by means of the moving body of treating liquid.

10. Apparatus for the continuous production of sheets and films from film-forming compositions coagulable in a liquid coagulating bath comprising means for extruding a film-forming solution in the form of a sheet, a container for coagulating liquid positioned to receive the extruded sheet, an elongated vessel for containing a regenerating liquid, means for carrying the sheet through the coagulating bath container to the elongated vessel substantially without pulling upon the sheet, and means for passing a regenerating liquid along said elongated vessel at a speed such that the coagulated sheet will be carried by the regenerating liquid along the vessel while permitting shrinkage of the sheet longitudinally and without subjecting the sheet to substantial longitudinal stresses.

11. Apparatus for the continuous production of sheets and films from film-forming compositions coagulable in a liquid coagulating bath comprising means for extruding a film-forming solution in the form of a sheet, a container for a coagulating bath positioned to receive the extruded sheet, means for supporting and transporting the sheet from the coagulating bath, an elongated container for regenerating liquid positioned to receive the film from the transporting means, means for propelling liquid through the elongated container at such speed as to support the film and move the film while permitting longitudinal shrinkage of the film and without exerting substantial tension longitudinally of the film, and means for elevating the film out of the regenerating liquid to exhaust from beneath the film deposits of gas formed during regeneration of the film.

12. An apparatus for producing a continuous body from a coagulable material comprising means for extruding a dispersion of coagulable material into the form of the body, means for coagulating the material of the body, an elongated vessel containing a treating liquid, means for passing the body from the coagulating means to the elongated vessel, means for propelling the treating liquid along the elongated vessel to support and convey the said body through said vessel, another elongated vessel for containing treating liquid, means for propelling the treating liquid along said other vessel to support and convey said body along said vessel, and means for removing the body from one vessel, inverting it, and passing it into the flowing liquid in the other vessel.

FRANK H. REICHEL.
ARTHUR O. RUSSELL.